J. BERGEY.
Thrashing Machine.
No. 9,293.
2 Sheets—Sheet 1.
Patented Oct. 5, 1852.
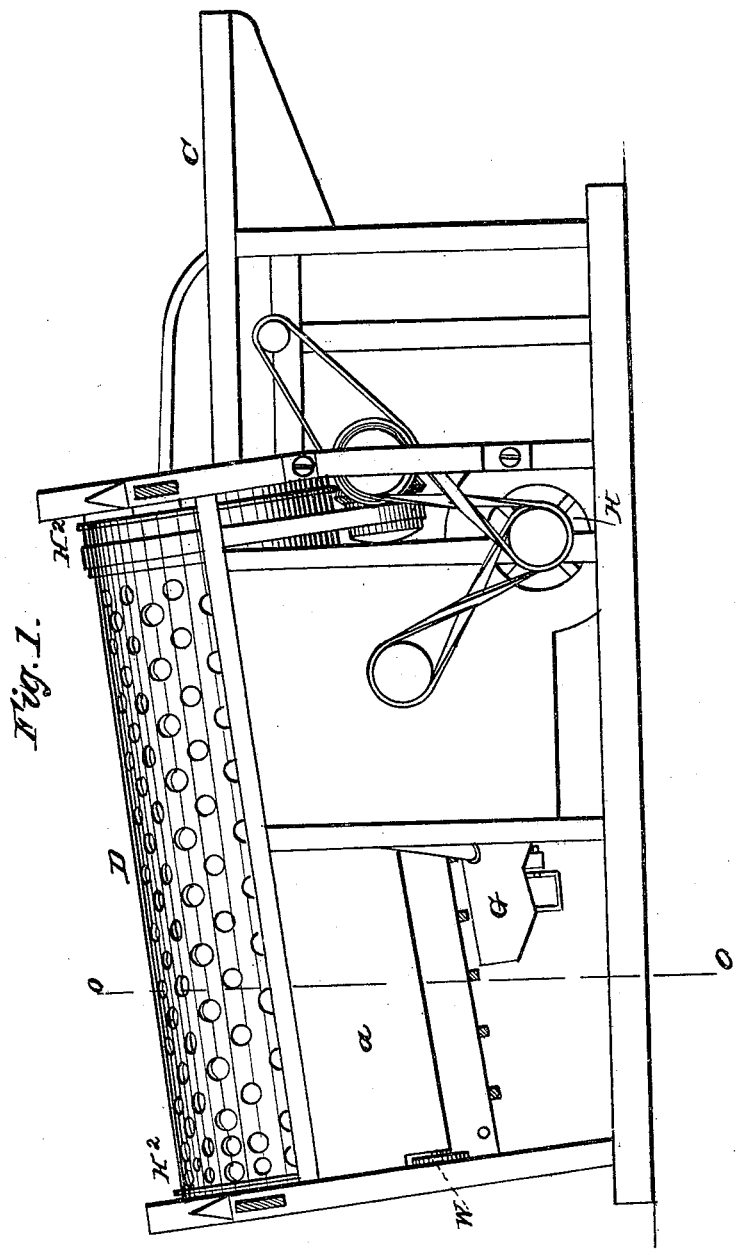

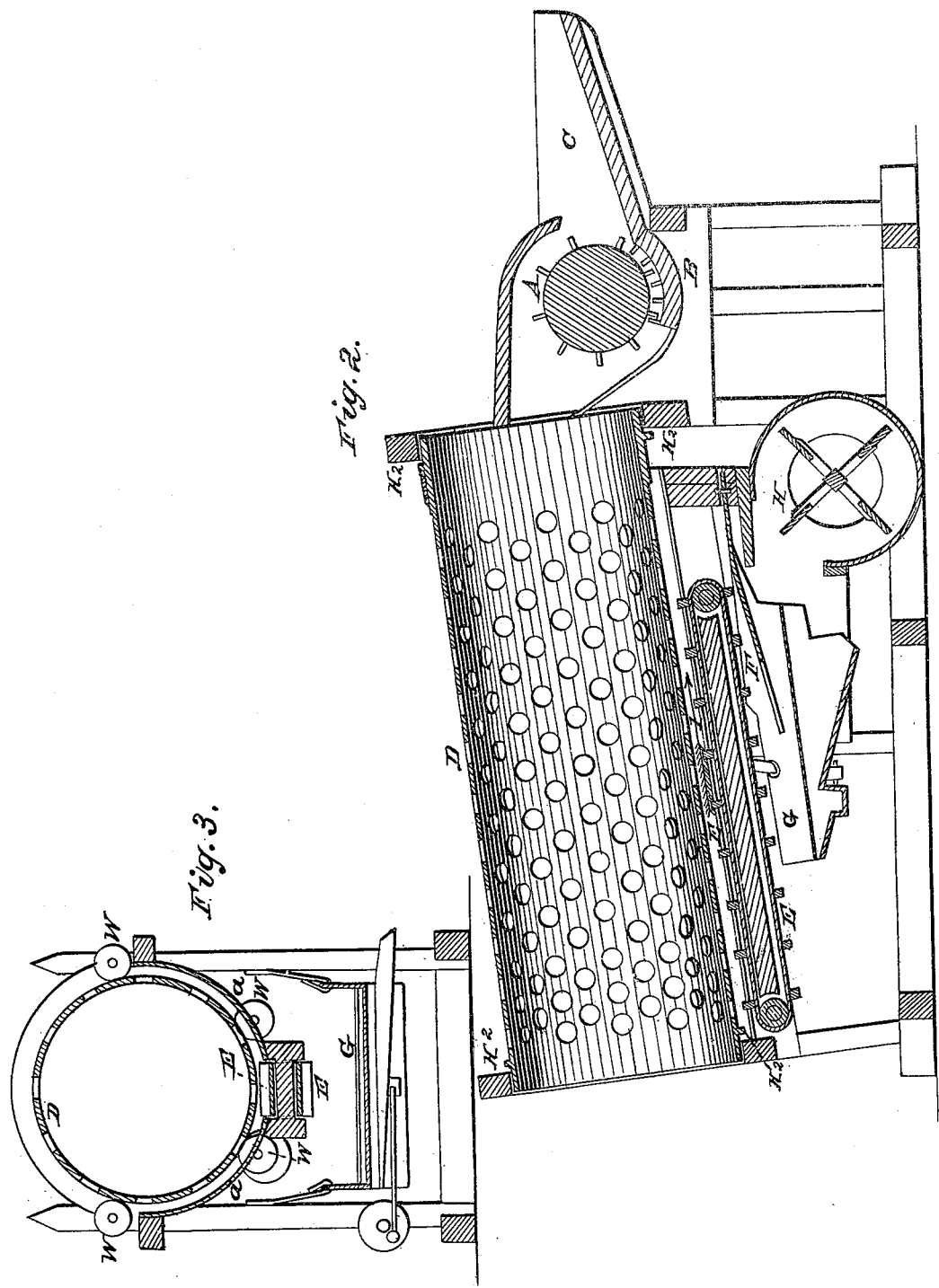

UNITED STATES PATENT OFFICE.

JACOB BERGEY, OF WADSWORTH, OHIO.

GRAIN-SEPARATOR.

Specification of Letters Patent No. 9,293, dated October 5, 1852.

*To all whom it may concern:*

Be it known that I, JACOB BERGEY, of Wadsworth, in the county of Medina and State of Ohio, have invented a certain new and useful Improvements in Machines for Threshing, Separating, and Winnowing Grain; and I do hereby declare that the following is a full, clear, and exact description of the same, reference being had to the accompanying drawing, forming part of this specification, in which—

Figure 1 is a side elevation. Fig. 2 a vertical longitudinal section, and Fig. 3 a transverse section taken as denoted by the line 0, 0, Fig. 1.

The same letters of reference indicate like parts throughout the several figures.

The nature of my invention and improvement consists in the manner of sustaining the inclined revolving perforated cylinder by antifriction wheels upon whose peripheries the cylinder turns, it being prevented from descending below its required level by circular or ring projections or flanges secured to the exterior of the cylinder and turning against the sides of the wheels, which, themselves turn on short studs or axles inserted into the frame of the machine. The advantages obtained by this mode of sustaining and operating the cylinder is that it can be made entirely open at both ends so as not to obstruct the passage of the straw through the same, by cross bars, central shafts, or other like obstructions, to be found in other machines made with revolving cylinder screens and, besides it will not require so much power to operate it as the screens heretofore used; because the separator which in other machines is generally the heaviest and most cumbersome part of the machine is in my arrangement made to turn upon the peripheries of antifriction wheels. And besides there is less gearing required in my arrangement than in others.

For the benefit of others whom it may concern I will proceed fully to describe my invention.

A is an ordinary threshing cylinder, and B, its toothed concave, the grain being threshed as it passes therethrough from the feeding shoe C to a revolving screen D which lies at a slight inclination from the horizontal position—dipping toward the ground at its back and farthest end from the cylinder A having no axle or sustaining pivots but supported upon the wheels W. This revolving screen is of any desired length and serves to act as a separator and conveyer to the straw which is delivered at the back or lower end of the screen (both ends being open) for the straw to pass through without obstruction, while the grain passes through the meshes or apertures onto an endless apron or conveyer E situated centrally and longitudinally under the screen D: the revolving screen, by its motion and inclined position, agitating the mass, separates the grain, works the straw to the back end of the screen and insures free and open meshes for the grain to pass through to the conveyer E which is an endless apron or belt having slats across it that receive the grain in between them for delivery during the travel of the belt as indicated by arrow 1, on to the inclined finger board F that conducts the grain on to the upper screen surface of the vibratory shoe G, the conveyer E being of corresponding inclination to the screen D and working in between stationary side guards that retain the grain from falling off the conveyer till arrival at the delivery end as specified: Incasement pieces *a a*, extending from either side of the conveyer E partly around the revolving screen, catch any grain falling through the latter on either side of the conveyer, and conduct it to the conveyer. The action upon the grain after being fed on to the shoe G is common to other machines of a like character and so well known as to need no prolonged reference here, the shoe G being operated by a shaker for agitating the grain which is delivered through the screen upper surface of the shoe down the discharge board underneath while the cheat cockle and other impurities, mixed up with the grain as it emerges from the conveyer, are blown off by the blast from a fan H.

The threshing cylinder A, revolving screen D, conveyer E, vibratory shoe G and fan H receive their motions by any suitable arrangement of bands and pulleys, or other devices.

The screen D may be of a polygonal shape and composed of perforated boards, tin, sheet iron, or reticulated wire, or any suitable material and be supported upon the peripheries of any suitable number of metal wheels W arranged in a proper manner beneath the cylinder screen. The ring projections or flanges around the cylinder are lettered H².

Now I am aware that revolving screens, separately considered, are not new, also that the conveyer or endless apron has been employed in combination with a threshing cylinder, vibrating shoe and fan, such therefore of themselves I do not claim. But What I do claim as new and desire to secure by Letters Patent, is—

The use of a hollow revolving cylinder so constructed and so moved as herein fully set forth for the purposes of a straw carrier by which the advantages above enumerated and explained are obtained.

In testimony whereof I have hereunto signed my name before two subscribing witnesses.

JACOB BERGEY.

Witnesses:
ALFD. GREGORY,
WM. M. SMITH.